United States Patent
Kisch (10) Patent No.: US 9,694,546 B2
(45) Date of Patent: Jul. 4, 2017

(54) AUTOMATED FIBER PLACEMENT COMPENSATION

(75) Inventor: Robert A. Kisch, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 1429 days.

(21) Appl. No.: 12/029,676

(22) Filed: Feb. 12, 2008

(65) Prior Publication Data

US 2009/0199948 A1    Aug. 13, 2009

(51) Int. Cl.
*B29C 70/38*    (2006.01)

(52) U.S. Cl.
CPC ..................... *B29C 70/38* (2013.01)

(58) Field of Classification Search
USPC ...... 156/64, 263, 275.5, 245, 123, 157, 159, 156/196, 217, 378, 379; 29/428, 897.2
See application file for complete search history.

(56) References Cited

U.S. PATENT DOCUMENTS

| | | | |
|---|---|---|---|
| 4,699,683 A | | 10/1987 | McCowin |
| 5,341,183 A | * | 8/1994 | Dorsey-Palmateer ........ 353/122 |
| 5,562,788 A | * | 10/1996 | Kitson et al. .................... 156/64 |
| 5,963,660 A | * | 10/1999 | Koontz et al. ................. 382/141 |
| 2005/0082262 A1 | * | 4/2005 | Rueb et al. ................. 219/121.6 |
| 2005/0203657 A1 | * | 9/2005 | Engelbart et al. ............. 700/110 |
| 2006/0106507 A1 | * | 5/2006 | Ledet et al. ..................... 701/23 |
| 2006/0108048 A1 | * | 5/2006 | Engelbart et al. ............... 156/64 |
| 2006/0180264 A1 | * | 8/2006 | Kisch et al. ................... 156/173 |
| 2007/0034313 A1 | * | 2/2007 | Engelbart et al. ............... 156/64 |
| 2007/0173966 A1 | * | 7/2007 | Oldani .......................... 700/110 |

OTHER PUBLICATIONS

Russell DeVlieg, Kyle Jeffries, Peter Vogeli, High-Speed Fiber Placement on Large Complex Structures, SAE Technical Paper, 2007-01-3843.

* cited by examiner

*Primary Examiner* — George Koch
(74) *Attorney, Agent, or Firm* — Yee & Associates, P.C.

(57) ABSTRACT

A method is provided to compensate for misplacement of tows by a fiber placement machine automatically controlled by programmed instructions. The method includes laying down a test layup of fiber tows using the machine; scanning the test layup to determine the position of the test layup relative to reference standards; determining misplacements in the position of the test layup; and, modifying the programmed instructions to compensate for the misplacements.

13 Claims, 5 Drawing Sheets

AUTOMATED FIBER PLACEMENT COMPENSATION

TECHNICAL FIELD

This disclosure generally relates to automated fiber placement systems, especially those used to fabricate composite structures, and deals more particularly with a system and method for compensating for mislocation of the fiber material.

BACKGROUND

Composite structures such as those used in the aerospace industries may be fabricated using automated fiber placement (AFP) machines which laydown relatively narrow strips of preimpregnated tows or slit composite tape onto a manufacturing tool, such as a mandrel. AFP machines may include one or more tape application heads and are typically operated by NC (numeric control) or CNC (computer numeric control) controllers which control the movement of heads and ancillary functions, including placing and cutting the tows "on the fly". In a typical AFP machine application, carbon fiber-epoxy tows are pulled from storage spools or creels through a set of guides. From the guides, the tows enter a cutter assembly where they are cut to the correct length by knives as the material course, also called a tow band, is laid over a substrate. The substrate may comprise a tool, mandrel or one or more underlying layers of composite material which have been previously laid down and compacted. Each tow has a dedicated cutting knife, however the number of knifes may vary depending on the number of tows and the width of each tow. As the tows emerge from the cutting assembly, they pass over a compaction roller which applies and compresses the tows onto the substrate surface. Tension may be maintained on the tows at all times to assist in pulling them through the AFP machine.

Accurate placement of tows during the laydown process is important in fabricating quality structures meeting high performance specifications. Tow placement accuracy may be challenging where the layup includes numerous short courses, ramps or other contoured features and/or bi-directional laydown. Placement accuracy also may be affected by the need for the application head to continuously accelerate in multiple axes during the laydown process, particularly where the speed of the laydown is adjusted on-the-fly. Finally, placement accuracy may be affected by the sequence and manner in which tows are drawn from the supply reels, fed and subsequently cut and compacted during a laydown sequence.

Currently, an essentially manual process may be used to measure the accuracy of tow placement and make adjustments to compensate for tow misplacements. For example, one process may begin with the laydown of bi-directional plies at slow, medium and fast speeds on a tool base. Then, any alternating laps or gaps between courses are manually measured. Any alternating laps or gaps are manually adjusted in the machine controller and then rerun. Any deviations in start placement or end placement for each tow of each course are manually measured and compared to scribe lines on the tool base. Any deviations in start or end placement are manually adjusted in the controller for each tow and then rerun. The steps described immediately above may be repeated until all laps and gaps between courses are minimized, and the placement of each tow is within a predetermined, acceptable distance of the scribe lines. The current process for correcting tow misplacements is therefore time consuming and may be subject to operator error.

Accordingly, there is a need for a method of compensating for misplacement of tows by an AFP machine that is both rapid and requires minimal operator intervention and/or manual measurements.

SUMMARY

In accordance with the disclosed embodiments, a system and method are provided for compensating for misplacement of tows in which measurement of the misplacement and compensating corrections are automated, requiring little or no intervention by human operators. The location of the ends of each placed tow and alternating laps and gaps between courses are detected by an optical scanner and recorded as scan data. Using the scan data and a set of reference standards representing the correct placement locations of the tows, a computer measures any differences between the detected locations of the tow ends and the correct placement locations. The computer uses an algorithm to generate compensation values that are used to make corrections in the AFP machine controller, which compensates for the misplacement.

According to one method embodiment, compensating for misplacement of fibers by an automated fiber placement machine, comprises laying down a test layup of tows using the machine; scanning the test layup to generate position data representing the position of the tows in the test layup; determining misplacements in the position of the tows by comparing the position data with reference datum representing the correct position of the tows; generating compensation values for correcting the misplacements; and, using the compensation values to correct the misplacements. Scanning the test layup may be performed by a laser or optical scanner. Determining misplacement of the tows may include calculating the dimensional difference between the determined position of the tows and a desired position represented by the reference datum. The method may further include forming a tool base or mandrel on which the test layup is laid down and applying datum lines on the tool representing the desired position of the layup. Scanning the test layup may include scanning the datum lines. The step of determining the misplacements may include determining dimensional differences between the position of the test layup and the position of the datum lines.

In accordance with another method embodiment, fabricating a composite structure comprises the steps of: providing a program to control an automated fiber placement machine; laying down a test layup of tows using the automated fiber placement machine; scanning the test layup to detect the position of the boundaries of the test fiber tows; determining misplacement of the tows by comparing the detected position of the boundaries with reference datum; and, modifying the program to compensate for the determined misplacements. Laying down the test layup may include laying down a course of tows on a tool base or mandrel and scanning the test layup may include detecting the location of the ends of the tows. Modifying the program may include generating a set of instructions that compensate for the determined mislocations. Determining the misplacements may include determining mislocations in the position of the ends of individual tows, or determining misplacements between successive courses or bands of tows.

In accordance with another embodiment, a system is provided for placing composite fibers, comprising: a fiber placement head for placing fiber tows on a substrate; a machine tool for moving the head over the substrate; a controller for controlling the operation of the machine tool; a control program for controlling the operation of the controller and the placement of the tows on the substrate; means for detecting the position of the tows placed on the substrate by the fiber placement head; and, a computer for calculating mislocations in the placement of the tows based on the detected placement and for generating compensation values used by the controller to correct the mislocations. The detecting means may include a laser or optical scanner. The computer may include reference datum representing the correct placement of the tows, and a stored algorithm for calculating the mislocations using the reference datum and the detected placement. A user interface may be provided for allowing a user to alter the reference datum information and the algorithm. The system may further include a tool base or mandrel on which the test layup tows may be placed by the head, wherein the tool base or mandrel includes datum lines thereon representing the intended placement of the tows.

The disclosed embodiment satisfies the need for a system and method for compensating for mislocations in fiber tow placement by an AFP machine which is automated, rapid and eliminates dependency on manual measurements.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
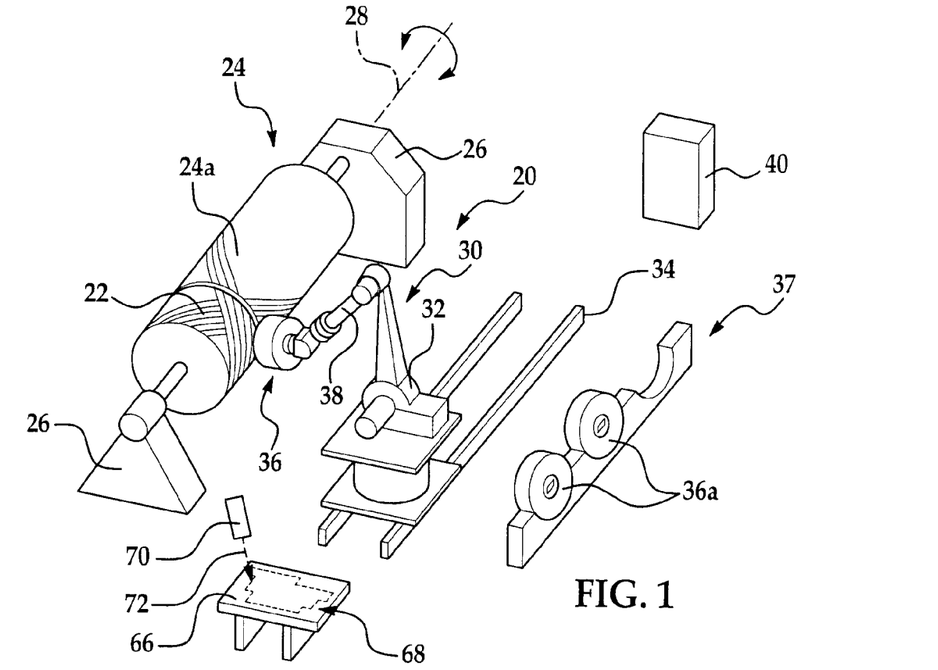
FIG. 1 is a perspective view of a typical AFP machine operation used to layup a composite structure.
Figure 2:
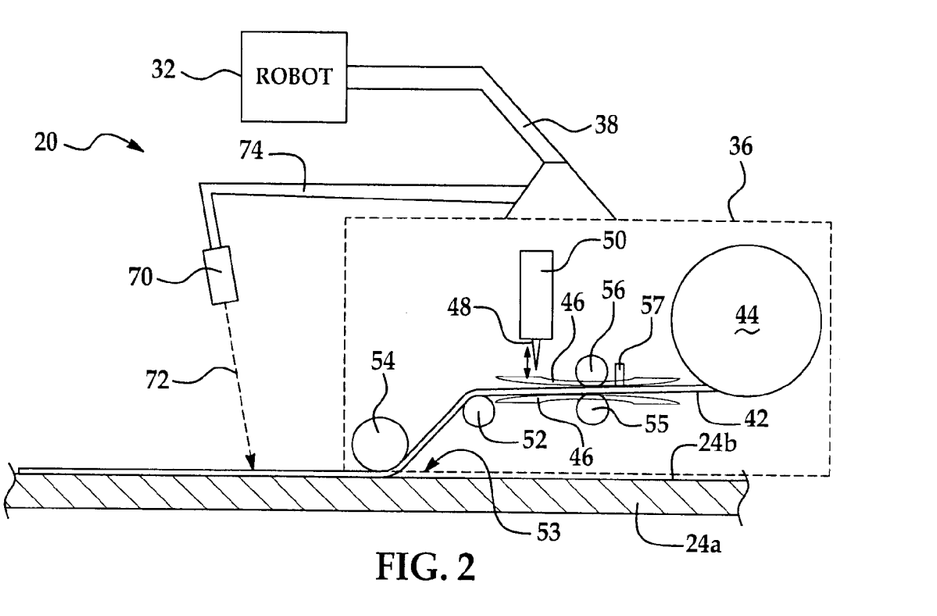
FIG. 2 is a diagrammatic, cross sectional view of a fiber placement head laying down tows on a substrate.

Referring first to FIGS. 1 and 2, an automated composite structure layup operation, generally indicated by the numeral 20, maybe used to fabricate composite structures by laying up courses 22 of reinforced fiber tows 42, such as, without limitation, carbon epoxy fiber tows, over a tool 24. In the illustrated example, the tool 24 comprises a cylindrical mandrel 24a mounted on supports 26 for rotation about its central axis 28, however a wide range of other tools are possible. As will be discussed below, multiple layers of the tow courses 22 may be laid up on the mandrel 24a as the mandrel 24a rotates, allowing various patterns of courses, ramps and contoured features to be laid down. Although the disclosed embodiments will be described in connection with the placement of tows 42 having nonstandard widths such as one-eighth inch or one-quarter inch, other forms of rovings and tape are contemplated, including those having standard widths such as, without limitation, three inches or six inches.

The tape courses 22 are placed or laid down on the mandrel 24a by an AFP machine generally indicated by the numeral 30 which, in the illustrated example, includes a tow application head 36 mounted on the arm 38 of a robot 32. The application head 36 simultaneously lays down multiple, parallel, contiguous strips of tows 42 to form each course 22. The robot 32 is mounted on rails 34 to allow the robot 32 to traverse the length of the mandrel 24a.

The application head 36 may include a quick release coupling (not shown) which allows it to be removed and interchanged with any in the set of offline heads 36a positioned at an offline station 37. Operation of the AFP machine 30, including operation of the application head 36 is controlled by a controller 40 which may comprise a NC (numeric control), CNC (computer numeric control) or other type of controller programmed to operate the AFP machine 30.

As best seen in FIG. 2, the application head 36 includes at least one, and up to thirty-two or more creels or spools 44 of tows 42 which are drawn through various guides 46 and rollers 52 into a nip 53 between the tool surface 24b and a compaction roller 54. Movement of the head 36, which is controlled by the robot 32, draws the tows 42 from the spools 44 as the compaction roller 54 forces the tows 42 down onto the tool surface 24b. The application head 36 further includes a cutter mechanism 50 associated with each of the spools 44 which includes a cut-off blade 48 that severs the corresponding tow 42 to a desired length. The cutter mechanisms 50 are independently controllable so as to permit each of the tows 42 in a course 22 to be cut to a desired length. Drive roller 55 and pinch roller 56 mechanisms are independently controllable so as to permit adding or starting of the tows 42 in a course 22 at a desired location. Clamp mechanisms 57 are independently controllable so as to hold the tows 42 in a course 22 after cutting and prevent slippage.

Additional details of a typical AFP machine 30 including the application head 36 are disclosed in U.S. Pat. No. 4,699,683 and US Patent Application Publication Number 20060180264A1 published Aug. 17, 2006, the entire disclosures of which are incorporated by reference herein.

In accordance with the disclosed embodiments, the placement location of the tows 42 on the tool 24 may be automatically checked for accuracy, and compensation may be made automatically for any misplacements, with little or no human intervention or manual measurements. Tow placement measurements may be performed by an optical scanner 70 which may comprise, for example, a laser scanner that directs a scanning beam 72 onto the surface of a tool base 66. The tool base 66 may include datum lines 68 that are visible to the optical scanner 70. The datum lines 68 represent the position where each tow 42 should start or stop. The datum lines 68 may also represent the location of the boundaries of the entire course 22, and/or the line along which two adjacent courses should be contiguous. Although visible datum lines are shown in the Figures, it should be noted that the datum line need not be formed on the tool base, but instead can be represented by data stored in a memory 78 (FIG. 3), as will be discussed in more detail below.

In the example illustrated in FIG. 1, the tool base 66 is positioned adjacent the robot 32 in order to allow the application head 36 to laydown a later discussed test lay-up 86 (FIG. 5) on the tool base 66. The optical scanner 70 may be stationarily mounted in the vicinity of the tool base 66 so that the scanning beam 72 may scan any area of the tool base 66. Alternatively, as shown in FIG. 2, the optical scanner 70 may be mounted on an extension 74 of the robotic arm 38 so that the scanning beam 72 moves in synchronization with the head 36.

Figure 3:
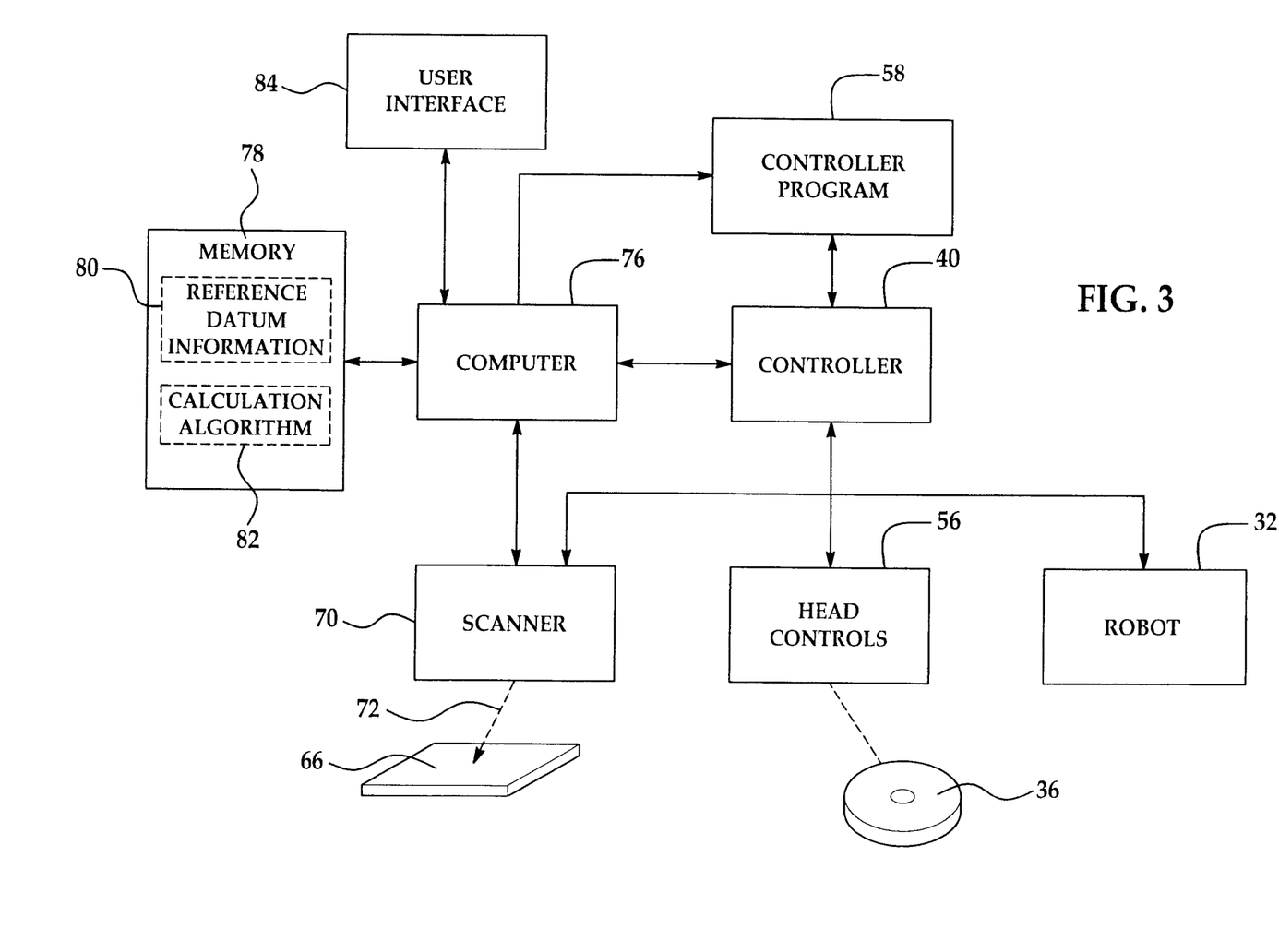
FIG. 3 is a combined block and diagrammatic view of a system for laying down tows and having compensation for tow placement misplacements.

Attention is now also directed to FIG. 3 which illustrates components of the disclosed embodiment, in block diagram form. Operation of the controller 40 is controlled by a controller program 58, which may include programmed instructions that determine placement of the tows 42 as well as the position and placement of each course 22. The controller 40 controls the operation of the robot 32 as well as various head controls 56 that determine placement of the tows 42, such as operation of the cutter mechanism 50 (FIG. 2). Some functions of the scanner 70 may also be controlled by the controller 40.

A computer 76 interfaces with the controller 40 and is connected to the scanner 70. Computer 76 includes a memory 78 in which there may be stored reference datum information 80 as well as a calculation algorithm 82 which will be described in more detail below. A user interface 84 may be provided in order to allow an operator to input and/or alter the reference datum information 80 and/or the calculation algorithm 82, to suit the particular application. The computer 76 controls the operation of the scanner 70 and receives scanning data from the scanner 70 which is used in the calculation algorithm 82. The computer 76 generates compensation values that are used by the controller program 58 to compensate for detected tow placement mislocations.

Figures 4, 5:
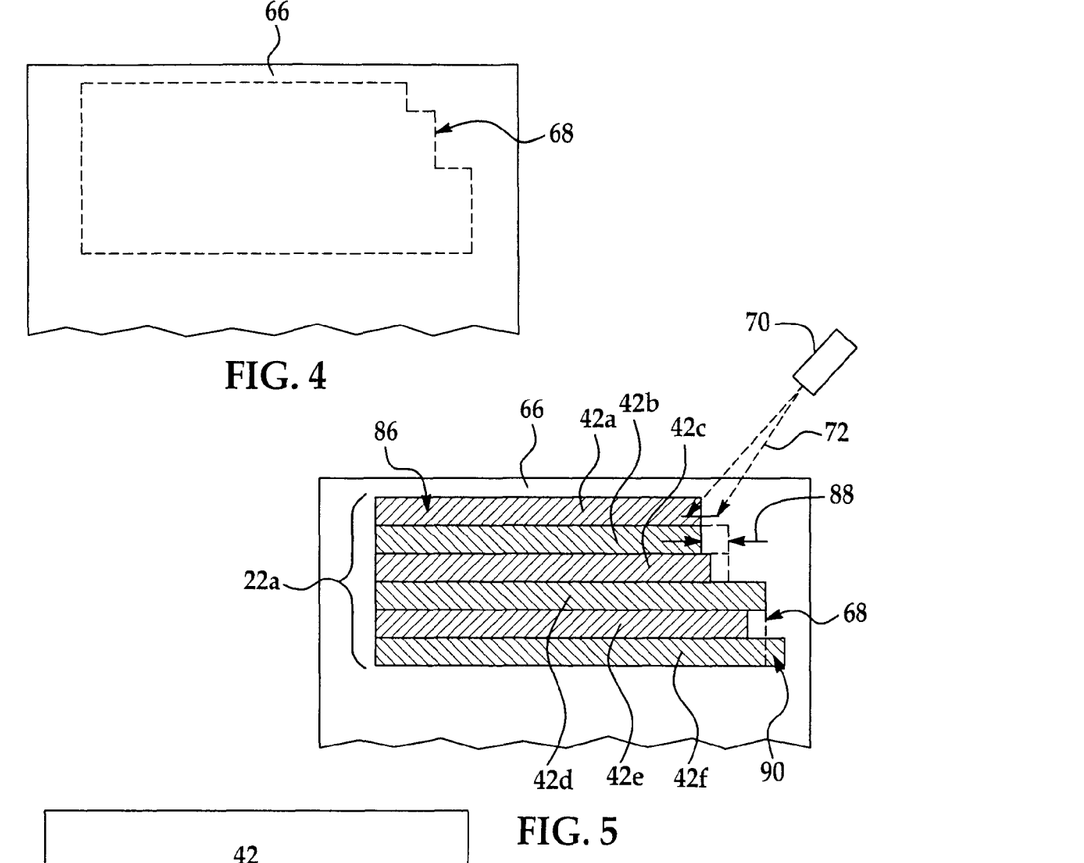
FIG. 4 is a fragmentary, plan view of a portion of a tool base, showing datum lines representing correct tow end placement positions.
FIG. 5 is a view similar to FIG. 4 but showing tows having been placed on the tool base with some misplacements.

Referring now also to FIGS. 4 and 5, in order to identify and correct tow placement mislocations, the application head 36 is used to laydown a test layup 86 on the tool base 66, comprising a single course 22a of parallel, contiguous tows 42a-42f. In the example illustrated in FIG. 4, the tool base 66a includes reference datum lines 68 corresponding to the boundary or outer profile of a course formed of tows 42 that are placed at the correct locations. The datum lines 68 therefore includes the placement location where each tow 42a-42f in the course 22a should start or end. The reference datum lines 68 may be formed in the tool base 66 by machining for example, or by other techniques that allow the scanner 70 to detect the location of the datum lines 68. As previously mentioned however, the datum lines 68 need not be physically present on the tool base 66, but rather may be represented by data, typically digital data, 80 that is stored in memory 78 and is accessed by the computer 76.

As can be seen in FIG. 5, some of the tows 42 in the test layup 86 contain misplacements. For example, tows 42b, 42c and 42e each terminate short of the reference datum line 68, resulting in gaps 88 caused by tow misplacement. Similarly, tow 42f extends beyond the reference datum line 68 at 90, also due to a misplacement. Tows 42a and 42d both terminate along the reference datum line 68, and therefore do not contain misplacements.

Under the control of the computer 70 (FIG. 3), the scanner 70 may direct the scanning beam 72 over the ends of each tows 42a-42f (see FIG. 5) in order to detect the location of the beginning and/or the end of the tow. This detected location information is delivered to the computer 76 which then determines the size of the gap (e.g. 88). The size of the gap 88 represents the amount of misplacement of the tow 42a-42f. In other words, the misplacement is calculated as the difference between the position of the datum line 68, and a detected end of the tow 42a-42f. The computer 76 then uses the calculation algorithm 82 (FIG. 3) to calculate misplacement compensation values that are delivered to the controller program 58 in order to correct the tow placement misplacement.

Figure 6:
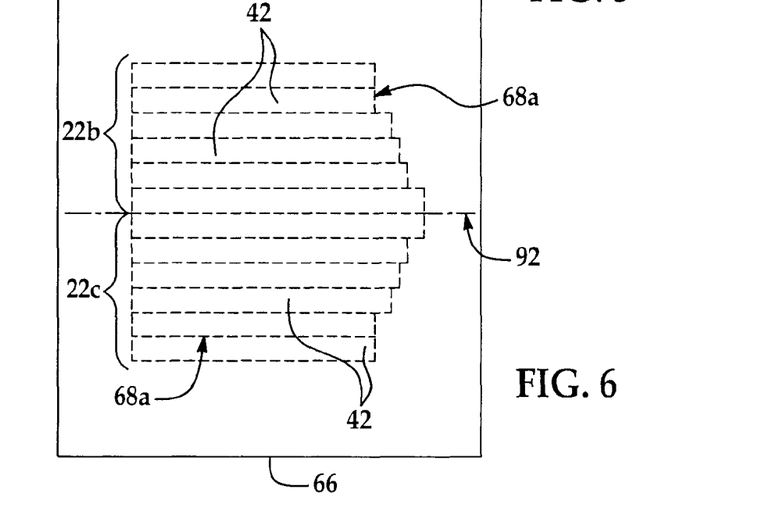
FIG. 6 is a plan view the tool base, showing datum lines representing correct course-to-course placement positions.
Figure 7:
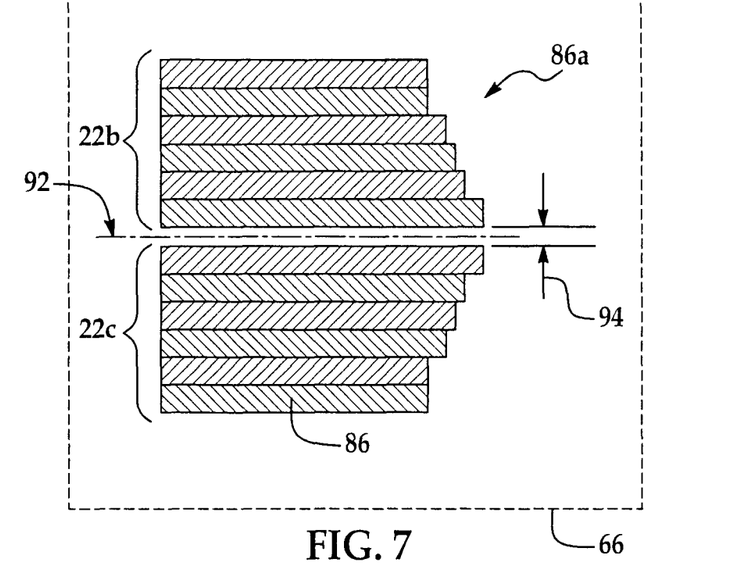
FIG. 7 is view similar to FIG. 5, but showing two adjacent courses of tows having been placed on the tool base with a misplacement creating a gap between the courses.

While FIGS. 4 and 5 illustrate a method for compensating for mislocations of the tows 42a-42f in the test lay-up 86, the disclosed method embodiments may also be employed to detect misplacement of courses 22. For example, as shown in FIGS. 6 and 7, reference datum lines 68a may be generated which represent the correct positions of two adjacent courses 22b, 22c of tows 42 that will be laid down to form a test layup 86a. As can be seen in FIG. 6, the reference datum lines 68a define a centerline 92 where the two courses 22b, 22c may be contiguous. However, as shown FIG. 7, each of the courses 22b, 22c contain placement mislocations which result in a gap 94 between the courses 22b, 22c.

The placement mislocation gap 94 is determined by scanning the courses 22b, 22c to determine the total lap or gap relative to each other or each of their positions relative to reference datum information 80 which is visually represented by the reference datum lines 68a shown in FIG. 6. Based on the measure of the gap 92, the calculation algorithm 82 is used to calculate compensation values required to correcting the placement mislocations. These compensation values are used to modify the controller program 58 in order to change the placement of one or both of the courses 22b, 22c.

Figure 8:
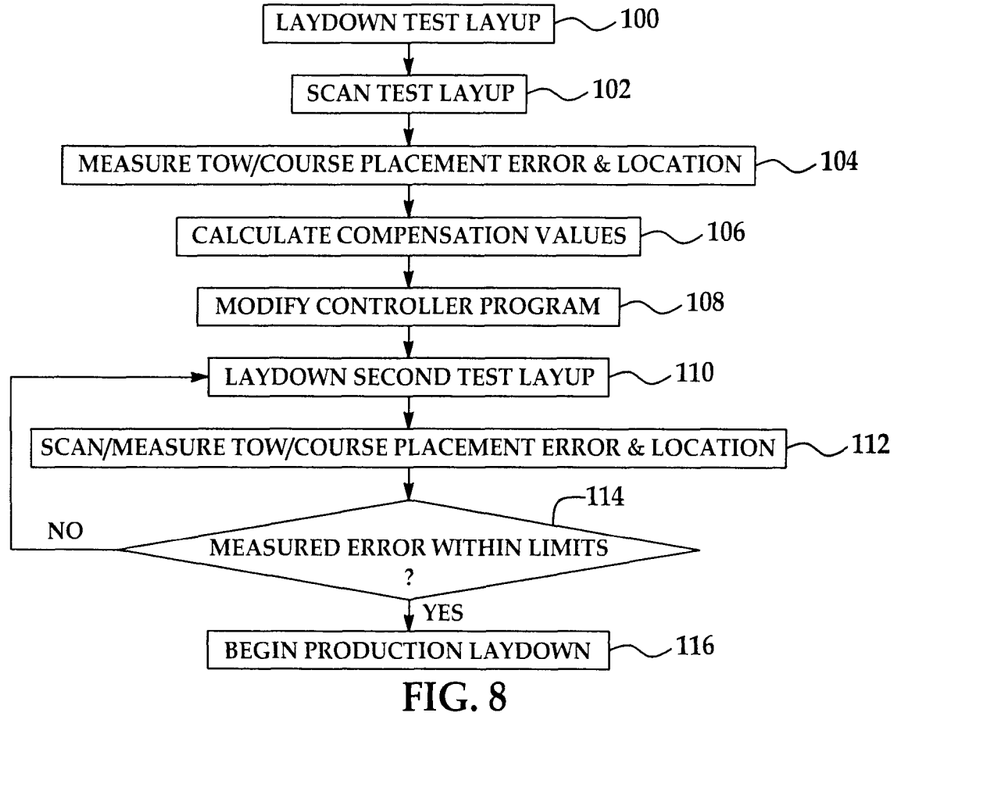
FIG. 8 is a flow diagram showing the steps of a method embodiment.

The steps followed in carrying out the method embodiment are shown in FIG. 8. Beginning at step 100, the AFP machine 30 lays down a test layup 86 on the tool base 66. As previously described, this test layup 86 may typically comprise a single course 22a including a plurality of tow strip 42 (FIG. 5). Next, at step 102, the test layup 86 is scanned using the scanner 70 in order to determine the position of the features on the test layup 86, including misplacement of the position of the course 22a and/or the position of individual tows 42. At 104, the placement information resulting from the scan is compared to the stored reference datum information 80 in order to measure the magnitude of the placement mislocations as well as the location of the mislocation. Next, at step 106, the computer 76 uses the calculation algorithm 82 to generate compensation values. The resulting compensation values are then used at step 108 to modify the controller program 58 in order to compensate for the placement mislocations.

At step 110 a second test layup 86 is laid down on the tool base 66, essentially identical to the first test layup 86, but reflecting placement adjustments resulting from use of the compensation values generated by the computer 70. Next, at step 112, the process of scanning the second layup 86 and measuring any placement mislocations are repeated. At step 114 if, the measured misplacement is within predetermined, acceptable limits, then production laydown may begin at 116, otherwise the sequence returns to step 110 in which a further test layup 86 is laid down, which is then scanned at 112 so that the mislocation can be re-measured and corrected.

Figure 9:
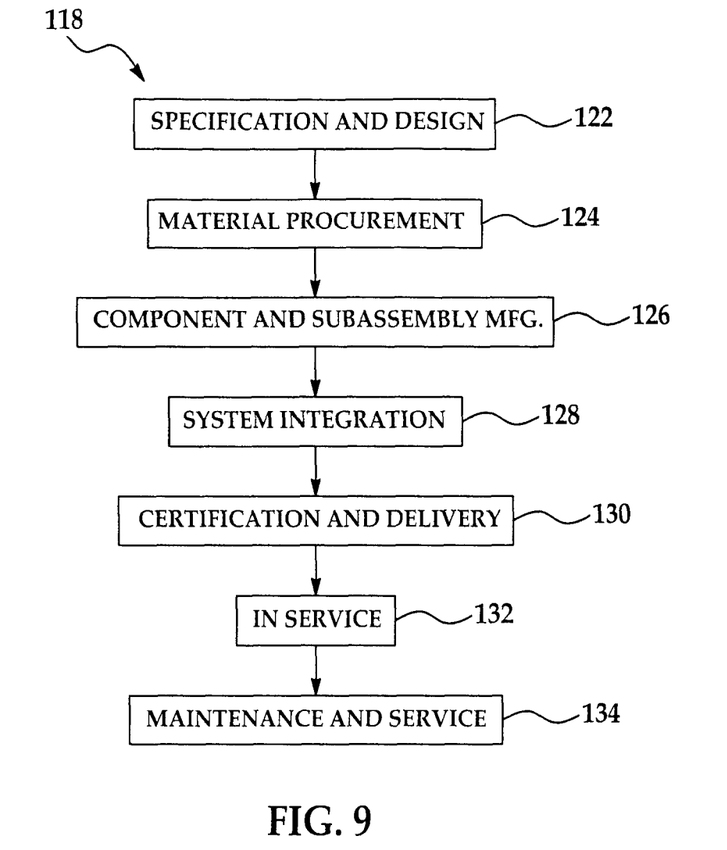
FIG. 9 is a flow diagram of aircraft production and service methodology.
Figure 10:
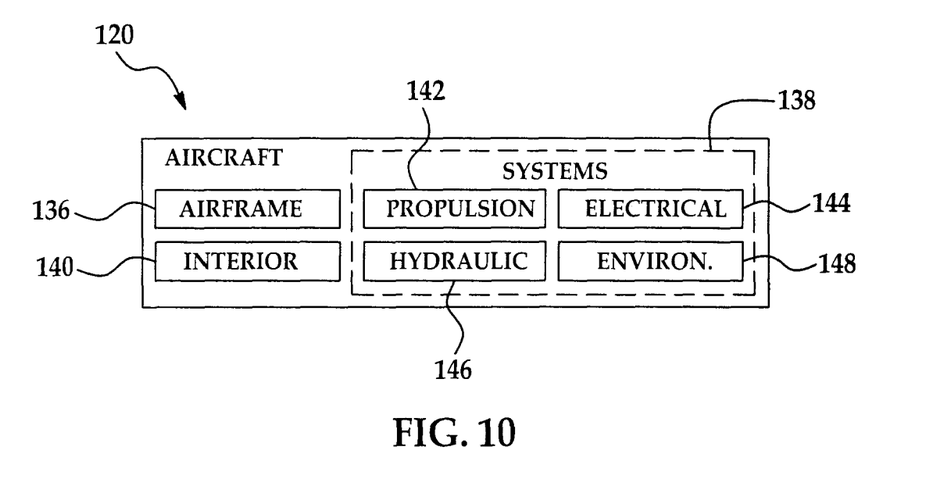
FIG. 10 is a block diagram of an aircraft.

Embodiments of the disclosure may find use in a variety of potential applications, particularly in the transportation industry, including for example, aerospace, marine and automotive applications. Thus, referring now to FIGS. 9 and 10, embodiments of the disclosure may be used in the context of an aircraft manufacturing and service method 118 as shown in FIG. 9 and an aircraft 120 as shown in FIG. 10. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 118 may include specification and design 122 of the aircraft 120 and material procurement 124. During production, component and subassembly manufacturing 126 and system integration 128 of the aircraft 120 takes place. Thereafter, the aircraft 120 may go through certification and delivery 130 in order to be placed in service 132. While in service by a customer, the aircraft 120 is scheduled for routine maintenance and service 134 (which may also include modification, reconfiguration, refurbishment, and so on).

Each of the processes of method 118 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 120 produced by exemplary method 118 may include an airframe 136 with a plurality of systems 138 and an interior 140. Examples of high-level systems 138 include one or more of a propulsion system 142, an electrical system 144, a hydraulic system 146, and an environmental system 148. Any number of other systems may be included. Although an aerospace example is shown, the principles of the disclosure may be applied to other industries, such as the marine and automotive industries.

Systems and methods embodied herein may be employed during any one or more of the stages of the production and service method 118. For example, components or subassemblies corresponding to production process 118 may be fabricated or manufactured in a manner similar to components or subassemblies produced while the aircraft 120 is in service. Also, one or more apparatus embodiments, method embodiments, or a combination thereof may be utilized during the production stages 126 and 128, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 134.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of identifying mislocations in a placement of tows by a fiber placement machine, comprising:
   laying down a first test layup comprising a first plurality of tows using the fiber placement machine and a controller program;
   scanning the first plurality of tows, wherein scanning the first plurality of tows generates position data for the first plurality of tows, and wherein the position data comprises a separate corresponding position of each of the first plurality of tows;
   comparing the position data with reference datum to identify mislocations, wherein the reference datum comprises a separate corresponding correct position of each of the plurality of tows;
   determining if the mislocations are within predetermined limits;
   generating compensation values from identified mislocations outside of the predetermined limits;
   modifying the controller program using the compensation values to form a modified program; and
   using the modified program to lay down a second test layup comprising a second plurality of tows, the second test layup being substantially similar to the first test layup but comprising placement adjustments resulting from the compensation values in the modified program.

2. The method of claim 1, wherein the scanning is performed by a laser.

3. The method of claim 1, further comprising:
   forming a tool base on which the plurality of tows is laid down; and
   forming datum lines on the tool base representing the separate corresponding correct position of each of the plurality of tows, wherein the datum lines are visible to an optical scanner.

4. The method of claim 3, further comprising:
   scanning the datum lines, wherein scanning the datum lines generates the reference datum.

5. The method of claim 1, wherein the mislocations comprise a mislocation of an end of a first tow in the first plurality of tows.

6. The method of claim 1, wherein the mislocations comprise a mislocation of a first course of tows in the first plurality of tows relative to a second course of tows in the first plurality of tows.

7. The method of claim 1, wherein determining if the mislocations are within predetermined limits comprises calculating a dimensional difference between the separate corresponding position of each of the plurality of tows and the separate corresponding correct position of each of the plurality of tows.

8. A method of compensating for mislocations by a fiber placement machine, comprising:
   laying down a first test layup comprising a first plurality of tows using the fiber placement machine and a controller program;
   identifying mislocations in the first plurality of tows;
   determining if the mislocations in the first plurality of tows are within predetermined limits;
   generating compensation values from identified mislocations outside of the predetermined limits in the first plurality of tows;
   modifying the controller program using the compensation values to form a modified program; and
   using the modified program to lay down a second test layup comprising a second plurality of tows, the second test layup being substantially similar to the first test layup but comprising placement adjustments resulting from the compensation values in the modified program.

9. The method of claim 8, further comprising:
   identifying mislocations in the second plurality of tows; and
   determining if the mislocations in the second plurality of tows are within the predetermined limits.

10. The method of claim 9, further comprising:
    laying down a production layup using the modified program if all of the mislocations in the second plurality of tows are within the predetermined limits.

11. The method of claim 9, further comprising:
    generating second compensation values from identified mislocations outside of the predetermined limits in the second plurality of tows;

modifying the modified program using the second compensation values to form a second modified program; and using the second modified program to lay down a third test layup comprising a third plurality of tows, the third test layup being substantially similar to the second test layup but comprising placement adjustments resulting from the second compensation values in the second modified program.

12. The method of claim 8, wherein identifying mislocations in the first plurality of tows comprises:

scanning the first plurality of tows, wherein scanning the first plurality of tows generates position data for the first plurality of tows, and wherein the position data comprises a separate corresponding position of each of the first plurality of tows; and comparing the position data with reference datum, wherein the reference datum comprises a separate corresponding correct position of each of the plurality of tows.

13. A method of compensating for mislocations by a fiber placement machine, comprising:

laying down a test layup comprising a plurality of tows using the fiber placement machine and a controller program;

identifying mislocations in the plurality of tows;

determining if the mislocations are within predetermined limits; and laying down a production layup using the controller program if all of the mislocations are within predetermined limits.

* * * * *

UNITED STATES PATENT AND TRADEMARK OFFICE
CERTIFICATE OF CORRECTION

PATENT NO. : 9,694,546 B2
APPLICATION NO. : 12/029676
DATED : July 4, 2017
INVENTOR(S) : Kisch Page 1 of 1

It is certified that error appears in the above-identified patent and that said Letters Patent is hereby corrected as shown below:

In the Claims

Column 7, Line 67, Claim 1 change "the plurality of tows" to --the first plurality of tows--

Signed and Sealed this
Ninth Day of October, 2018

Andrei Iancu
*Director of the United States Patent and Trademark Office*